(12) United States Patent
Hiner et al.

(10) Patent No.: US 7,763,801 B2
(45) Date of Patent: Jul. 27, 2010

(54) DIRECT BURY SPLICE KIT

(76) Inventors: William Hiner, 8 Briarcastle Ct., O'Fallon, MO (US) 63368; James C. Keeven, 2641 Whitetail La., O'Fallon, MO (US) 63368; Lloyd Herbert King, Jr., 394 Larimore Valley Dr., Chesterfield, MO (US) 63005

( * ) Notice: Subject to any disclaimer, the term of this patent is extended or adjusted under 35 U.S.C. 154(b) by 0 days.

(21) Appl. No.: 12/077,267

(22) Filed: Mar. 18, 2008

(65) Prior Publication Data

US 2008/0236863 A1 Oct. 2, 2008

Related U.S. Application Data

(60) Provisional application No. 60/920,461, filed on Mar. 28, 2007, provisional application No. 61/062,386, filed on Jan. 26, 2008.

(51) Int. Cl.
*H02G 15/113* (2006.01)
(52) U.S. Cl. .................................................. 174/92
(58) Field of Classification Search ............... 174/76, 174/92
See application file for complete search history.

(56) References Cited

U.S. PATENT DOCUMENTS 5,594,210 A * 1/1997 Yabe .......................... 174/76
5,796,041 A * 8/1998 Suzuki et al. ................. 174/92

* cited by examiner

*Primary Examiner*—Chau N Nguyen
(74) *Attorney, Agent, or Firm*—Jacobson & Johnson LLC

(57) ABSTRACT

A decoder system and a direct bury splice kit for in situ encapsulation of an electrical wire and wire connector wherein the encapsulation minimizes separating forces between the joined wires in the wire connector.

22 Claims, 6 Drawing Sheets

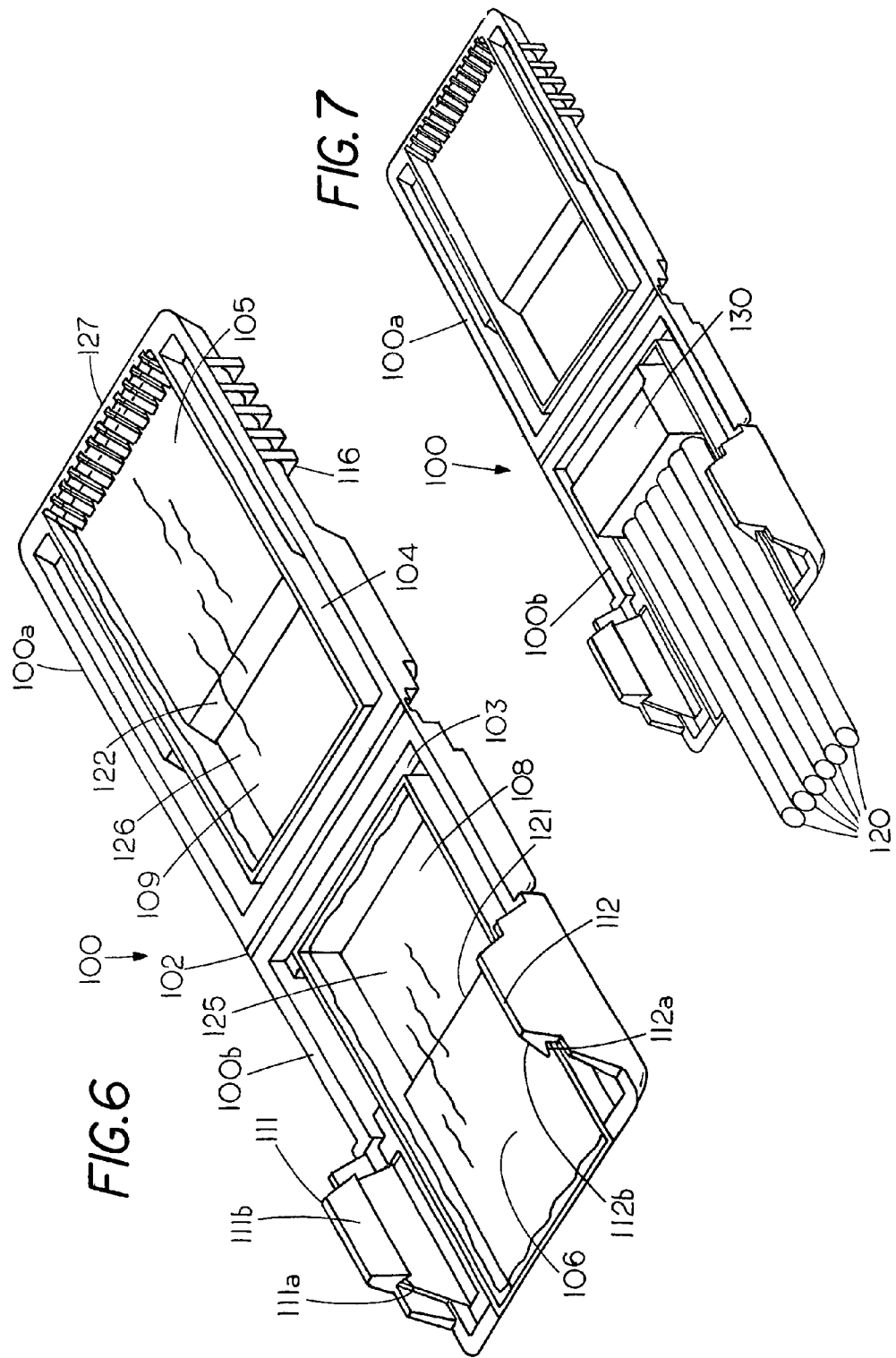

DIRECT BURY SPLICE KIT

CROSS REFERENCE TO RELATED APPLICATIONS

This application claims priority from provisional application Ser. No. 60/920,461 titled Direct Bury Connector filed Mar. 28, 2007 and provisional application Ser. No. 61/062,386 titled Irrigation Connectors filed Jan. 26, 2008.

STATEMENT REGARDING FEDERALLY SPONSORED RESEARCH OR DEVELOPMENT

None

FIELD OF THE INVENTION

This invention relates generally to encapsulateable wire connectors and systems with encapsulateable wire connectors and, more specifically, to direct bury splice kits and to irrigation decoder systems having direct bury splice kits securing a decoder to the control system.

REFERENCE TO A MICROFICHE APPENDIX

None

BACKGROUND OF THE INVENTION

In the irrigation industry the area to be irrigated is divided into zones. Each zone contains a number of irrigation valves and solenoid valves. Typically, the solenoid valves are opened or closed to deliver more or less water to the different zones in the area being irrigated. One of the systems used to control the operation of solenoid valves, which are located in the various zones to be irrigated, is a decoder system. Typically, in a decoder system a controller sends control signals for opening and closing the irrigation valves through the same electrical wires that supply power to open and close the solenoid operated irrigation valves. An advantage of the decoder system over a conventional controller system is that it reduces the number of electrical wires required in the control system. Also when new irrigation zones are added to the irrigation system it eliminates the need to run additional wires from each of the added irrigation valves to the controller. Instead the wires to control the new irrigation valves can be connected to the nearest decoder or the nearest wires thus avoiding running wires from each of the added valves to the controller. Although the decoder systems eliminate running of multiple wires, the systems are more complex and require multiple wire splices which create a potential for multiple failure points in the system.

Often times the splices in the electrical wire for the decoder systems need to be made to wires that are buried underground since the valves and the wires are located underground. In addition, in the decoder system the splices are usually located in wet locations since the wires are located in the area being irrigated. Therefore care needs to be taken to ensure that the electrical connections are and remain in a waterproof condition.

While there are available direct bury splice kits that allow one to form an electrical connection with a twist-on wire connector numerous splice kits are required for each irrigation system. Using a decoder system, which requires even more electrical wire splices than a conventional system, generally increases the chance that a system failure can occur at one or more of the electrical splices. Commercially available direct bury connectors include splice kits sold by the 3M Company (St. Paul, Minn.) under the name DBY-6 and DBR-6. Typically, such direct bury splice kits have long been used for splicing electrical wires that are to remain underground in dry or wet soils for a length of time. Once an electrical connection is formed in a wire connector, such as a twist-on wire connector, the entire twist-on wire connector is inserted into what is known as a "grease tube". The grease tube is an elongated test tube like container with an electrically insulating and waterproof material located in the closed end of the tube. The wire connector is forced into the electrically insulating material until the entire twist-on electrical connector is covered with the electrical insulating material. A cover on the end of the tube is then sealed against the exposed portion of wire to retain the twist-on wire connector in the grease tube. The grease tube with the wire connector encapsulated in the electrical insulating material can then be buried underground. In these types of underground systems the twist-on wire connector must be forced endwise into the grease tube by grasping the twisted wire leads that extend from the twist-on wire connector. As the twist-on wire connector is forced to travel endwise into the insulating sealant the electrically insulating sealant must be separated and then allowed to flow back around the twist-on wire connector before the twist-on wire connector and the wire connections therein can be encapsulated. Unless the wire connections are completely covered with insulating material electrical failure can occur after the grease tube is buried underground.

SUMMARY OF THE INVENTION

A direct bury splice kit with mateable pods for encapsulating an electrical wire connector and a decoder system having multiple junctions connected by direct bury splice kits wherein each of a pair of partial pods that are mateable to each other about an electrical connector are capable of carrying a sealant to provide insitu waterproof encapsulation of the electrical leads and the wire connector when the partial pods are brought into mating engagement with each other while avoiding exerting separating forces between the joined wires in the wire connector. An alternate embodiment uses an open end housing with a mateable cover and a sealant in the open end housing that also avoids exerting separating forces between the joined wires during the encapsulation process.

BRIEF DESCRIPTION OF THE DRAWINGS

FIG. 6 shows a one-piece housing of an end foldable direct bury splice kit in an open condition;

FIG. 7 shows direct bury splice kit of FIG. 6 in an open condition with a push-in wire connector;

DESCRIPTION OF THE PREFERRED EMBODIMENT

Figure 1:
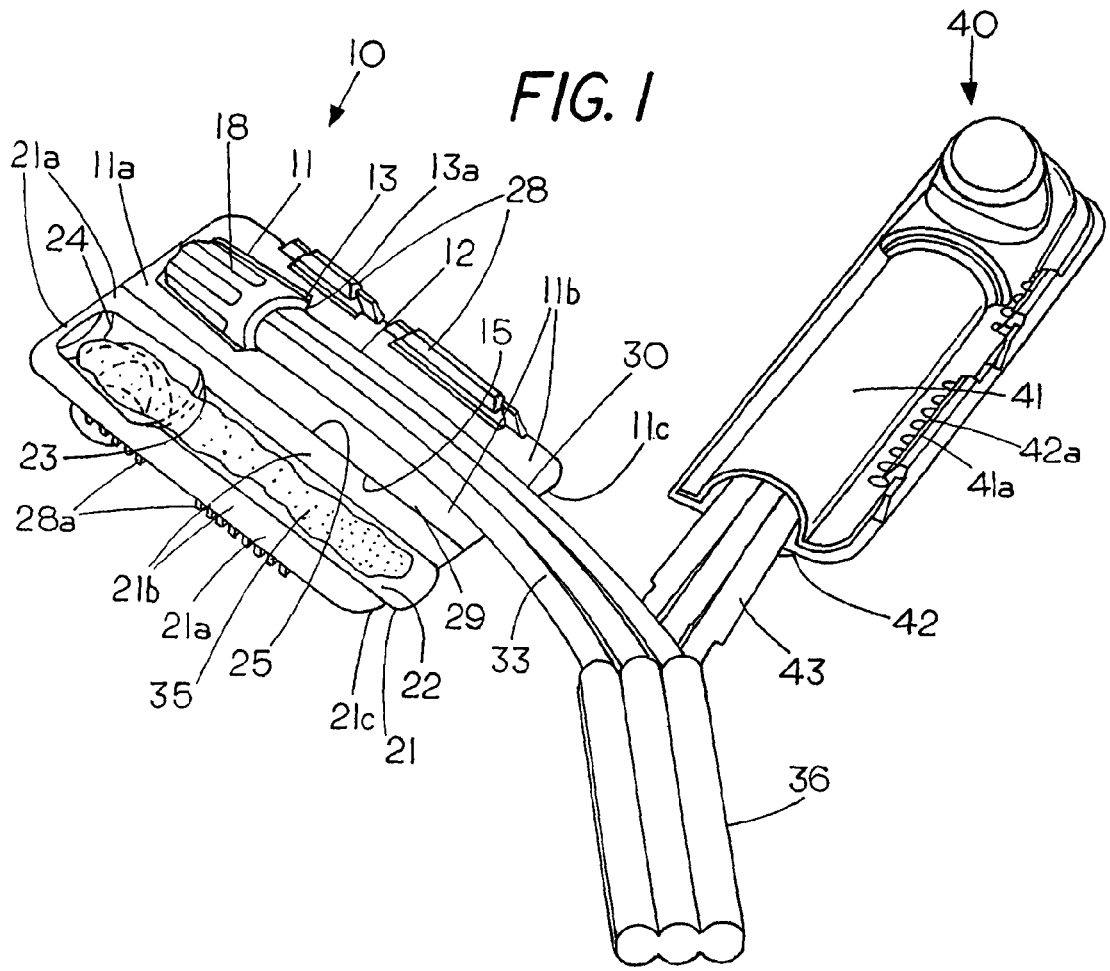
FIG. 1 shows a first direct bury splice kit in a closed condition on one set of electrical wires and a second direct bury splice kit in an open condition on a second set of electrical wires.

FIG. 1 shows a decoder wire 36 that has terminal wires 33 connected by a first side foldable direct bury decoder splice kit 10, which is shown in an open condition proximate an electrical wire connector 18. Similarly, terminal wires 43 are connected by a second side foldable direct bury decoder splice kit or pod 40, which is in a closed condition and also encapsulates an electrical wire connector (not shown). Direct bury decoder splice kit 10 and direct bury decoder splice kit 40 are identical. Direct bury decoder splice kit 40 is shown in the closed condition and direct bury decoder splice kit 10 is shown in an open condition. As shown in the closed condition direct bury decoder splice kit 40 includes a split pod housing comprising a first partial pod 41 and a second partial pod 42 that form an enclosure or pod around the end of electrical leads 43 when the pods are folded together.

The direct bury splice kit 10, which is shown in the open condition, includes a first elongated partial pod 21 having an interrupted U-shaped peripheral wing or flange 21a that extends laterally outward from three sides of partial pod 21. Wing 21a includes a flat mateable face 21b. Located in partial pod 21 is a first elongated partial wire channel 22, a first partial wire connector cavity 24 and a shoulder 23 that connects wire cavity 22 to wire connector cavity 24. Partial wire channel 22 extends inward from an end 21c of the first partial pod 21 and terminates in partial wire connector cavity 24. A sealant 35 is located in channel 22 and in wire connector cavity 24 and elongated wire channel 22. Sealant 35 can be any of a number of different sealants; however, a gel sealant which is free of oils and films and coheres to itself is preferred since such a gel sealant can be peeled free of an electrical connection if the connection needs to be reformed. An example of such a sealant which is commercially available is a general purpose silicone gel sold by Quantum Silicones, Inc. of Richmond Va.

A living hinge 29 hingedly connects one edge 15 of a wing or flange 11a of partial pod 11 to one edge 25 of a wing 21a of partial pod 21 to enable the folding closure of the partial pod 11 and 21 around a wire connector located therein. That is, the hinge 29 functions to guide the partial pods 11 and 21 into a mating engagement around the wire connector 18 and the wires 33 as the partial pod 21 and 11 are folded onto each other so as to align and mate the cavities in each of the partial pods with each other.

Partial pod 11 includes a U-shaped wing 11a with a U-shaped flat mateable flange face 11b that extends around three sides of pod 11. Located in partial pod 11 is a first elongated wire channel 30 having wires 33 therein, a wire connector cavity 13 having a twist-on wire connector 18 therein and a shoulder 13a that partial divides wire cavity 13 from wire channel 30. Wire channel 30, which preferably has a sealant therein, extends inward from an open end 11c of the partial pod 11 and terminates in wire connector cavity 13. Latches 28 on the side of partial pod 11 allow one to latch partial pod 11 to latch clasps 28a on partial pod 21 to form a split pod enclosure around a wire connector.

Similarly, the partial pod 21 has a wire channel 22, a wire connector cavity 24 and a shoulder 23 that connects wire connector cavity 13 to wire channel 30 with the sealant 35 located in wire channel 22 and wire connector cavity 24.

In the embodiment shown in FIG. 1 the terminal end of a set of wires 33 are connected together with a twist-on wire connector 18. The twist-on wire connector 18 and the wires 33 are shown located partially in wire channel 30 and partially in wire connector cavity 13 of pod 11 so that both the twist-on wire connector 18 and the wires 33 extend above the flange face 11b of the partial pod 11. In this embodiment each of the pods 11 and 21 contribute to forming an encapsulating enclosure around the wire connector 18 and the wire leads 33. The encapsulation condition is illustrated by identical direct bury splice kit 40 which shows pod 41 and pod 42 in a closed condition with latch 42a and latch clasps 41a engaging each other to hold the pod in a closed condition.

The wire channel 12 and the wire connector cavity 13 of partial pod 11 and wire channel 30 are shown as sufficiently small so as not to hold the entire wire connector 18 and the wires 33 therein, however when wire connector cavity 13 and wire connector cavity 24 are mated to each other in the folded condition the combined volume of the wire connector cavities 24 and 13 is sufficiently large so that they can hold both the wire connector 18 and a sealant in an encapsulating condition there around.

Similarly, wire channel 30 and wire channel 22 are shown as sufficiently small so as not to hold the entire wire 33 therein, however, when combined the wire channel 22 and wire channel 30 have a combined volume that is sufficient to hold both the wires 33 and a sealant in an encapsulating condition around the wires 33. That is, when the first partial pod 11 and the second partial pod 21 are folded together in a face-to-face relationship the wire channel 22 and the wire channel 30 form an enclosure large enough for the wires 33 as well as the sealant. Similarly, the wire connector cavity 13 and the wire connector cavity 24 cooperate to form a wire connector cavity that is large enough to hold the wire connector 18 and sealant when the first partial pod 11 is folded into a face-to-face relationship with the second partial pod 21.

While the embodiments are shown with the pods containing individual channels and individual cavities that are smaller than the wires and connector, if desired one could have one or both of the wire channels or wire connector cavities larger than the volume of the wire connector or the wires. In another example of the invention one may use a single wire channel in only one of the pods to contain the wires and the sealant or a single wire connector cavity in one of the pods could be used to contain both the wire connector and the sealant.

FIG. 1 shows a decoder wire 36 with branch wires 33 and 43 and how the direct bury decoder splice kit 10 with a sealant appears in an open condition on wires 33 and how a second direct bury decoder splice kit 40 with a partial pod 41 and 42 cooperate to in situ encapsulate the end of electrical wires 43 when a sealant is located in either or both of the channels.

In the embodiment shown in FIG. 1 a sealant may be located in either or both of the first partial pod 21 or the second partial pod 11 so that when the partial pod 21 and the partial pod 11 are brought into mating engagement the partial pod 21 and the partial pod 11 form an enclosure around wire connector 18 while the sealant 35 forms an in situ waterproof sealant encapsulation of wire connector 18 and an electrical lead 33 extending therefrom. Thus, with a wire connector 18 securing the electrical spice in an electrical connection and an encapsulating pod comprising mateable pod parts 11 and 21 with at least one of the mateable pod parts having a sealant therein the pod parts can be mated around a wire connector 18 containing the electrical splice so that one can maintain the electrical splice therein in a waterproof condition when the mateable pod parts are in a mated condition.

In the embodiment of FIG. 1 the shape of the wire connector cavity 13 and 24 is such that once a connector 18, such as a twist-on wire connector 18 is placed therein the flange shoulder 23 located in the first partial pod 21 assist in retaining the wire connector in the partial pod 21 on the wire connector. In the preferred embodiment pods 11 and 21 are formed from a rigid or semi-rigid material so that the two pods can be quickly brought into mating engagement with each other. Although rigid material for pods is preferred other types of materials that allow for the folding of the pods about an electrical connections can also be used with the present invention.

The use of the direct bury split pod connector 40 is particularly well suited for the irrigation industry which utilizes decoders that contain a two-wire network. Typically, a two conductor direct burial cable with a polyethylene jacket is preferred to provide underground connections between various components of the irrigation system using a decoder because of the multiple connectors required for each decoder. Such conductors are often referred to as a biline.

As shown in FIG. 1 the direct bury splice kit with mateable pods for encapsulating an electrical wire connector and a decoder system have multiple junctions connected by direct bury splice kits wherein each of a pair of partial pods that are mateable to each other about an electrical connector are capable of carrying a sealant to provide in situ waterproof encapsulation of the electrical leads and the wire connector when the partial pods are brought into mating engagement with each other while avoiding exerting separating forces between the joined wires in the wire connector. That is the folding of the pods onto each other does not produce a stress on the junction between the wires as the wires and the connector are covered as a unit. By eliminating the step of forcing a twist-on wire into a sealant by pushing on the wire leads one can avoid undue stress on the electrical junction which may result in a faulty junction.

Figure 1A:
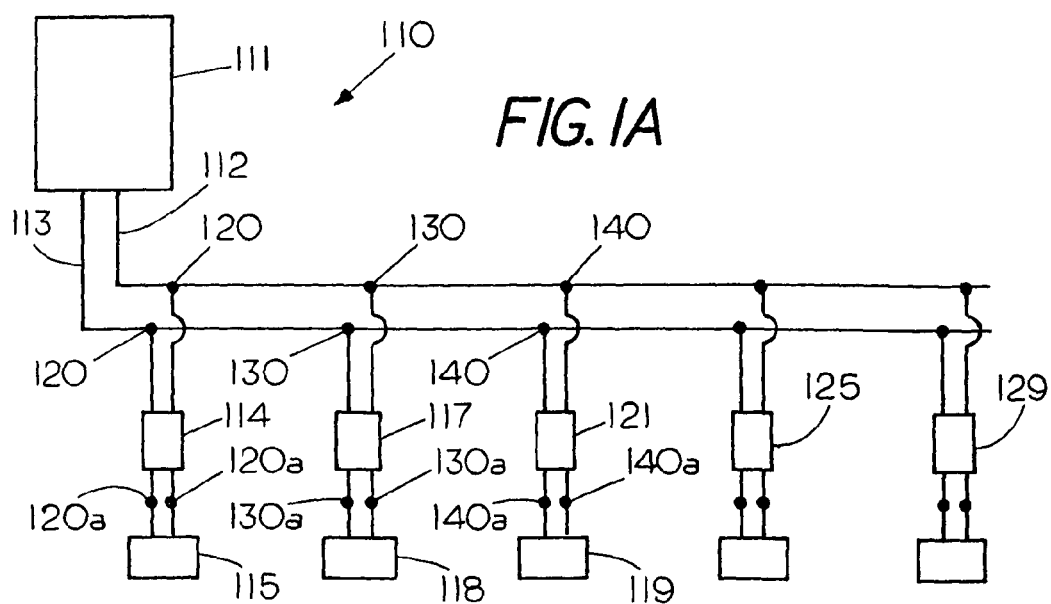
FIG. 1A shows a diagram of an irrigation system using a decoder system with a plurality of split pod connectors.

An irrigation system such as shown in FIG. 1A typically includes a base station controller 111 that connects to multiple solenoid valves that turn the irrigation water on or off. The decoder electronics, which can be potted in chemical and waterproof compounds, measure the current used by each solenoid. Usually a two- or three conductor cable is connected between the base station or control station and a decoder (bicoder) that operates the solenoid valve. Since splices made to the two-conductor cable are located underground it is important that the splices be kept waterproof. The use of the foldable encapsulating pods containing a sealant such as a waterproof gel allows one to encapsulate and seal the splices in a waterproof condition without disturbing the wire splice since the partial pods are folded around the wire connector rather than having to force the wire connector into a tube of sealant by grasping and pushing on the wire leads that extend from the end of a twist-on wire connector.

FIG. 1A shows a decoder irrigation system 110 with an irrigation controller 111 having a two wire cable with wires 112 and 113 extending there from. Connected to wire 112 and 113 by splices 120 is a first decoder 114. Decoder 114 is connected to solenoid valve 115 by splices 120a. Thus for each decoder four splices are required. Similarly, connected to wire 112 and 113 by splices 130 is a second decoder 117. Decoder 117 is connected to solenoid valve 118 by splices 130a. Also connected to wire 112 and 113 by splices 140 is a third decoder 121. Decoder 121 is connected to solenoid valve 119 by splices 140a. Similarly, decoder 125 and 129 are each connected to the system by four splices. As can be seen from the diagram of the decoder irrigation system of FIG. 1 multiple splices are required to each solenoid valve. The direct bury splice kit 10 is well suited for forming the electrical connections into an encapsulated waterproof connection.

Figure 2:
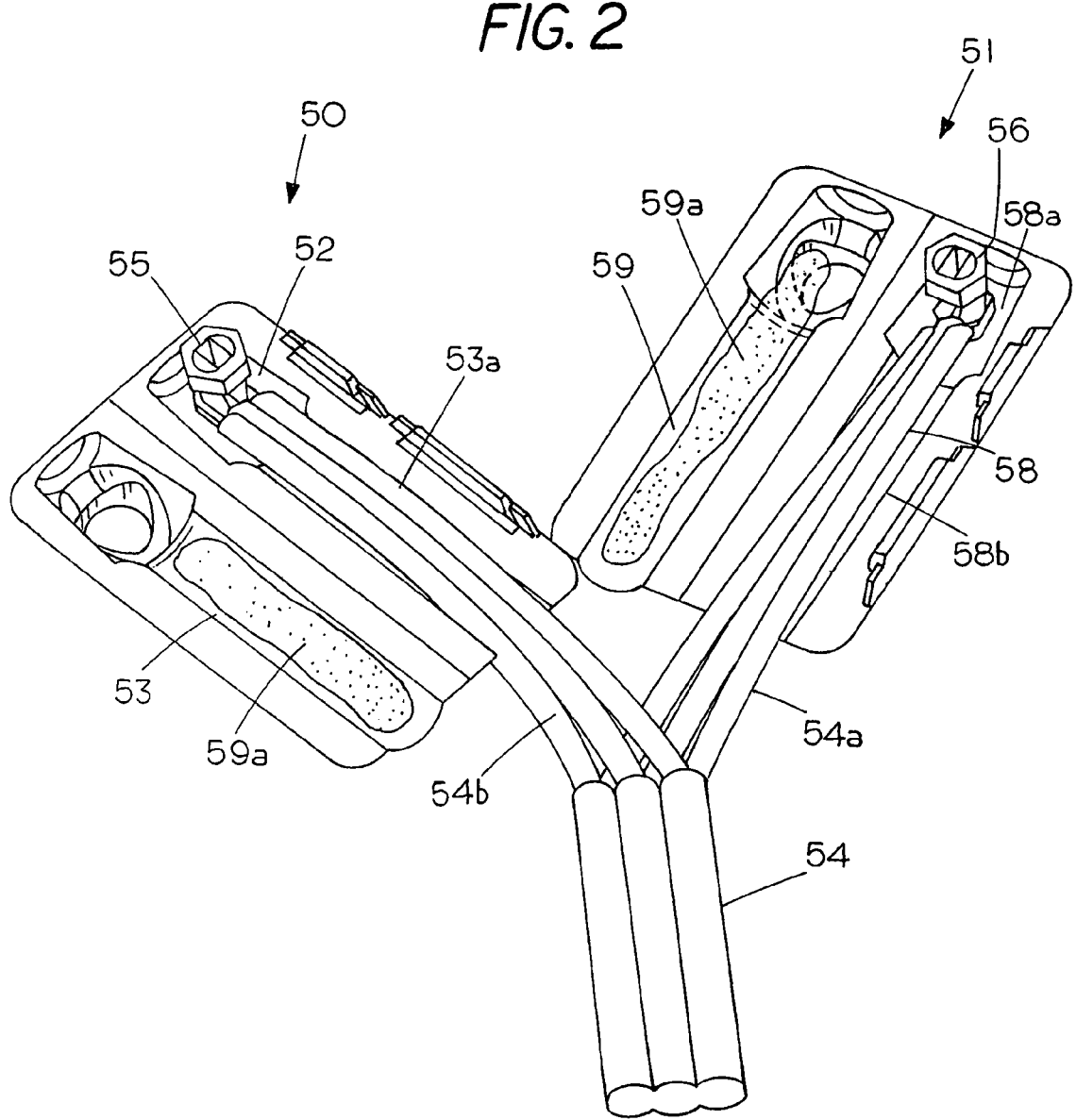
FIG. 2 shows a first direct bury splice kit with a partial bolt connector therein in an open condition on one set of electrical wires and a second direct bury splice kit with a bolt connector in an open condition on a second set of electrical wires.

FIG. 2 shows an example of two direct bury decoder splice kits comprising a first pod connector 50 and a second pod connector 51 in an open condition. Pod connector 50 contains an electrical wire 54 with a bolt connector 55 located partially in a wire connector cavity 52 and a wire channel 53a partially encapsulating a set of electrical wires 54b and a wire channel 53 with a sealant 59a therein. Similarly, pod connector 51 contains an electrical wire 54a with a bolt connector 56 located partially in a wire connector cavity 58a and a wire channel 58b partially encapsulating a set of electrical wires 58. Direct bury splice kit 50 and direct bury splice kit 51 is similar to direct bury decoder splice kit 10 and 40 except the pod 50 and pod 51 each contain a split bolt wire connectors therein rather than twist-on wire connector.

A sealant 59a is located in pod 50 for in situ encapsulation of the wire connector 55 and the leads 54b and a sealant 59a is also located in pod 51. Thus the pod connector can be used with various electrical wire connectors including twist-on wire connectors and split bolt connectors.

Thus the example of FIG. 2 shows direct bury decoder splice kit with mateable pods for encapsulating an electrical wire connector and a decoder system having multiple junctions connected by direct bury splice kits wherein each of a pair of partial pods that are mateable to each other about an electrical connector are capable of carrying a sealant to provide in situ waterproof encapsulation of the electrical leads and the wire connector when the partial pods are brought into mating engagement with each other while avoiding exerting separating forces between the joined wires in the wire connector.

Figure 3:
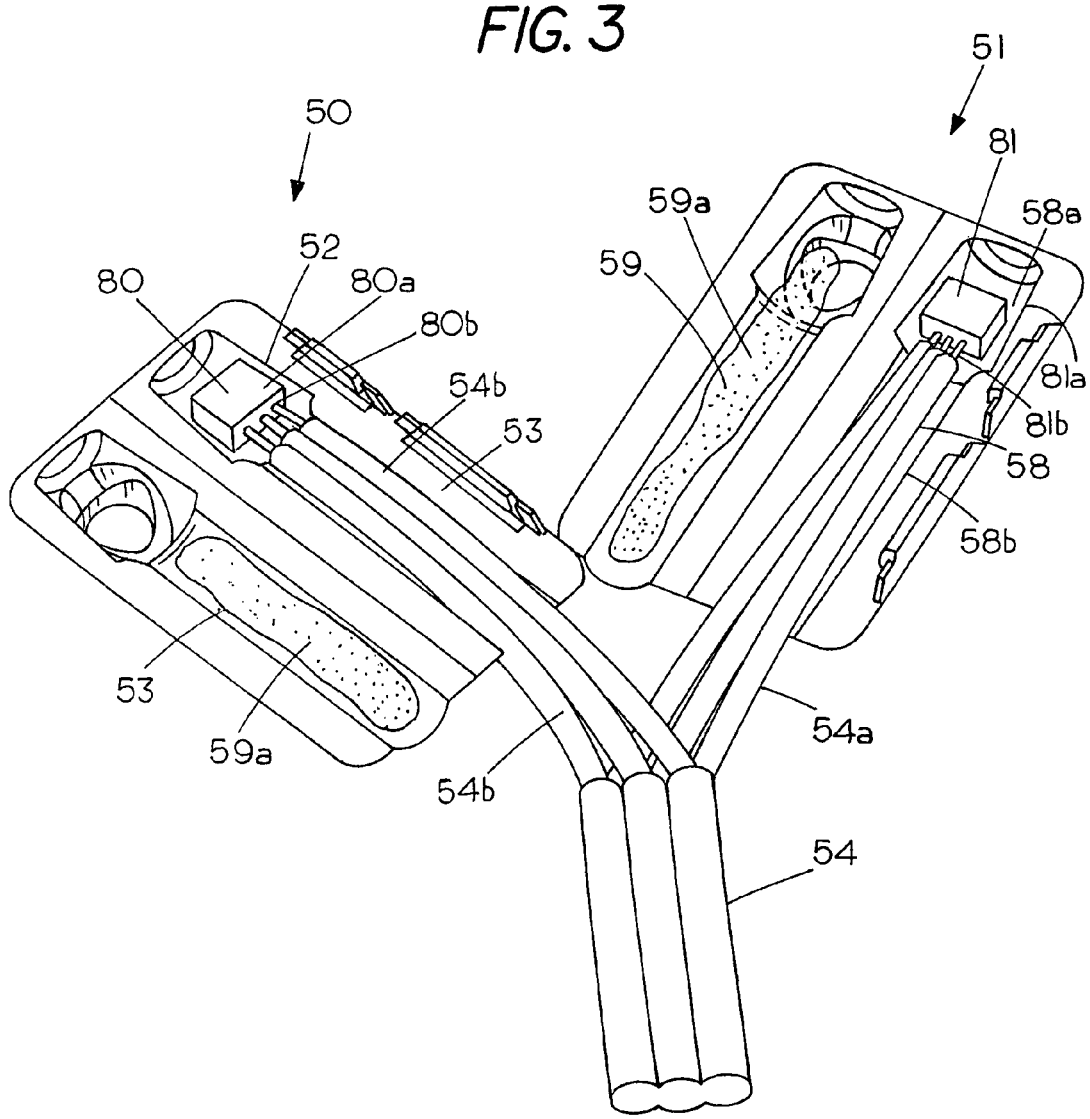
FIG. 3 shows a first direct bury splice kit with a push-in connector therein in an open condition on one set of electrical wires and a second direct bury splice kit with a push-in wire connector in an open condition on a second set of electrical wires.

FIG. 3 shows another example of two direct bury decoder splice kits except that pod connector 50 contains an electrical wire 54 with a push-in connector 80 located partially in a wire connector cavity 52 and a wire channel 53a partially encapsulating a set of electrical wires 54b. Wire channel 53 is shown with sealant 59a therein. Similarly, pod connector 51 contains an electrical wire 54a with a push-in wire connector 81 located partially in a wire connector cavity 58a and a wire channel 58b partially encapsulating a set of electrical wires 58. The push-in wire connector 80 comprises a housing 80a with openings 80b for insertion of electrical wires therein and the push-in wire connector 81 comprises a housing 81a with openings 81b for insertion of electrical wires therein. Once inserted in the housing 80a the ends of the wires connect to a bus strip (not shown) thereby completing the connection from the end of one wire to the end of the other wires in the push-in connector. Push-in wire connectors are commercially available from a number of manufacturers and an example of a push-in wire connector can be found in U.S. Pat. No. 6,746,286, which is hereby incorporated by reference.

Thus the example of FIG. 3 shows direct bury decoder splice kit with mateable pods for encapsulating an electrical wire connector and a decoder system having multiple junctions connected by direct bury splice kits wherein each of a pair of partial pods that are mateable to each other about an electrical connector are capable of carrying a sealant to provide in situ waterproof encapsulation of the electrical leads and the wire connector when the partial pods are brought into mating engagement with each other while avoiding exerting separating forces between the joined wires in the wire connector.

While twist-on wire connectors, split bolt and push-in wire connectors are examples of connectors that are useable with the direct bury splice kit it should be understood that other connectors can also be used with the direct bury splice kit to provide an encapsulated wire connector that remains in a waterproof condition during field use since the folding of the pods minimizes strain on electrical splices therein.

Figure 4:
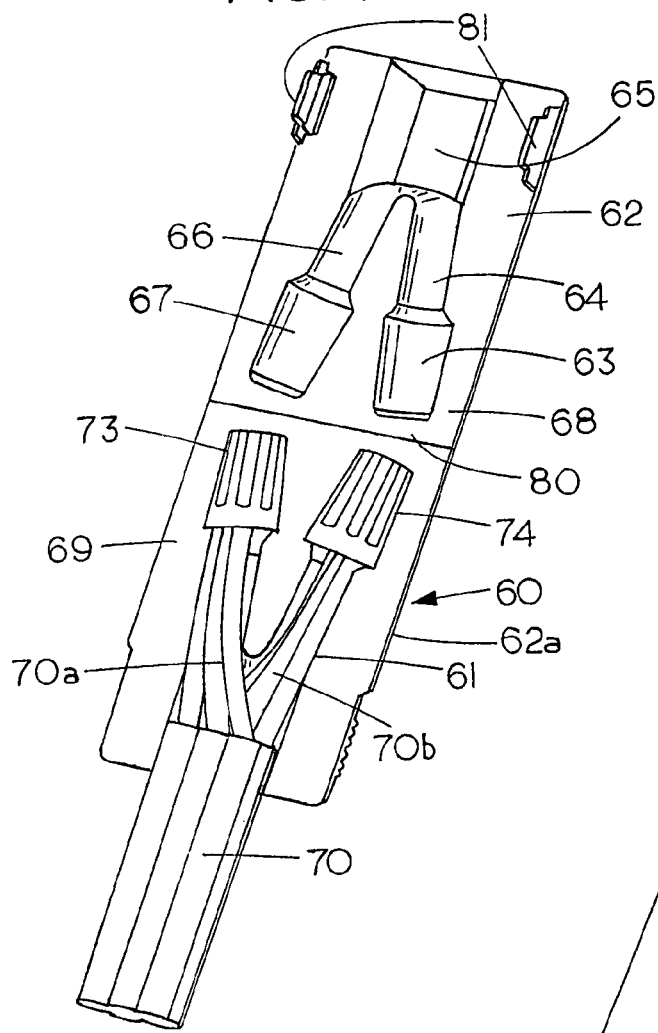
FIG. 4 shows an end foldable direct bury splice kit in an open condition.

FIG. 4 shows an example of an end foldable direct bury splice kit 60 in an open condition with a bifurcated partial pod 62 and a mating bifurcated partial pod 62a that is well suited as a direct bury decoder splice kit. The direct bury splice kit 60 includes a main wire channel 65 that bifurcates into a first wire channel 64 and a second wire channel 66 with a wire connector cavity 67 at the end of wire channel 66 and a wire connector cavity 63 at the end wire channel 64. A U-shaped peripheral wing 68 extends around three sides of the bifurcated pod 62 with a living hinge 80 connecting the peripheral wing 68 to an identical peripheral U-shaped wing 69 that extends laterally outward on three sides of spilt pod 61. In the embodiment shown an electrical wire 70 with a set of wires 70a and a set of wires 70b are connected by a twist-on wire connector 73 and a twist-on wire connector 74. Latches 81 allow for locking enclosure of the two halves of the partial pod to each other. A sealant not shown is present in one or all of the pods to provide for the in situ encapsulation of both the wire connection and the wire connector. If desired a transparent sealant and a transparent housing can be used with any of the examples of the invention to permit a user to inspect the wire connections after the pods have been brought into an encapsulating condition around a wire connection.

Figure 5:
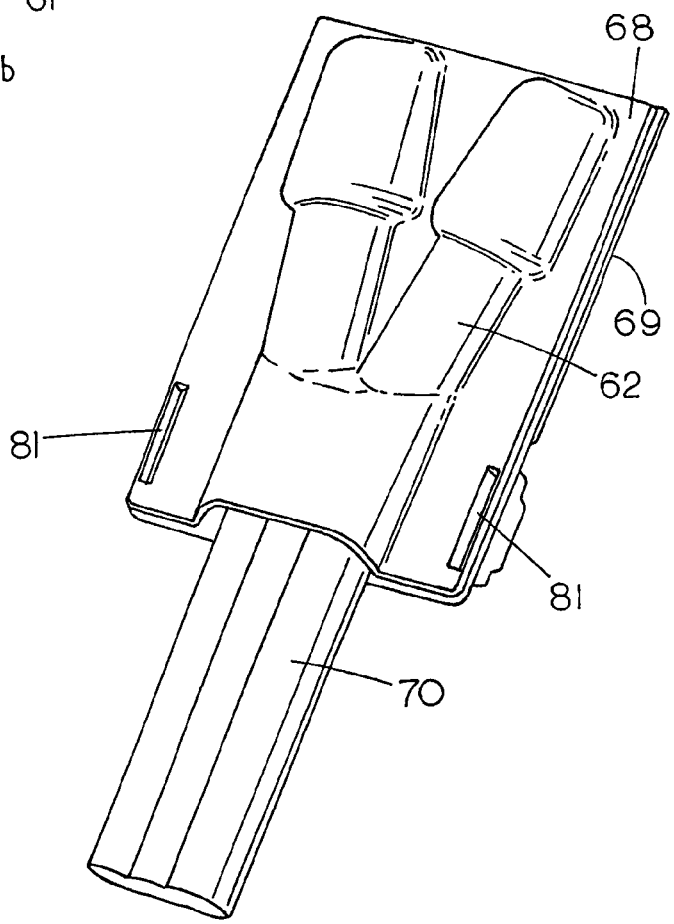
FIG. 5 shows the end foldable direct bury splice kit of FIG. 4 in a closed condition.

FIG. 5 shows the end foldable direct bury decoder splice kit 60 in the closed condition encapsulating a portion of the electrical wire 70 and the wire connectors thereon. In this embodiment the partial pods are folded in an end condition to cover and in situ encapsulate the electrical wires therein.

FIG. 6 shows another example of an end foldable direct bury splice kit 100 comprising a one-piece wire connector housing or two-part pod 100 in an open condition with the housing comprising a first open wire connector pod 100a and a second open wire connector pod 100b that are connected to each other by a living hinge 102 which extends from side to side of pods 100a and 100b. Pod 100b includes a U-shaped rectangular channel 103 for mating with a U-shaped wall 104 on pod 100a when the pod 100b and 100a are brought into a closed condition. In the mated condition, channel 103 and wall 104 form a three-sided barrier to retain sealant located in the connector housing from being forced therepast by the closing of pod 100a and 100b about a wire connector. While the embodiment of FIG. 6 is shown with a U-shaped channel a channel to retain the sealant may or may not be used.

Located interiorly of wall 104 is a flat face jaw 105 that extends from side to side of pod 100a and similarly located interiorly of channel 103 is a second flat face jaw 106 that extends from side to side of pod 100b. Jaw 105 and jaw 106 are positioned such that when the wire connector pods 100a and 100b are pivoted about hinge 102 the jaws 105 and 106 can clampingly hold wire leads therebetween and form a waterproof sealant around the wires. While a clamping action can be provided by the jaws it is also within the scope of the invention that one may or may not have the jaws form a clamping action on the wires.

Located in pod 100b proximate jaw 106 is a sealant pocket 108 for holding a sealant therein and similarly located in pod 100a proximate jaw 105 is a sealant pocket 109 for retaining a sealant therein. Sealant pocket 108 and 109 are positioned an equal distance from hinge 102 so that when the pod 100a and the pod 100b are brought into a closed condition the pocket 108 and pocket 109 are in alignment with each other to form a single closed pocket or enclosure for receiving a wire connector (not shown).

Wire connector housing 100 comprises an electrically insulating material that is also waterproof.

Located on one side of pod 100b is a first resilient extension 111 with a hook shaped lip 111a and an angled guide surface 111b. Similarly located on the opposite side of pod 100b is a second resilient extension 112 with a hook shaped lip 112a and angled guide surface 112b. Each of the extensions are integral to the pod and extend perpendicularly outward from pod 100b to enable extension 111 to engage ribs 118 and extension 112 to engage ribs 116 on pod 100a.

Figure 8:
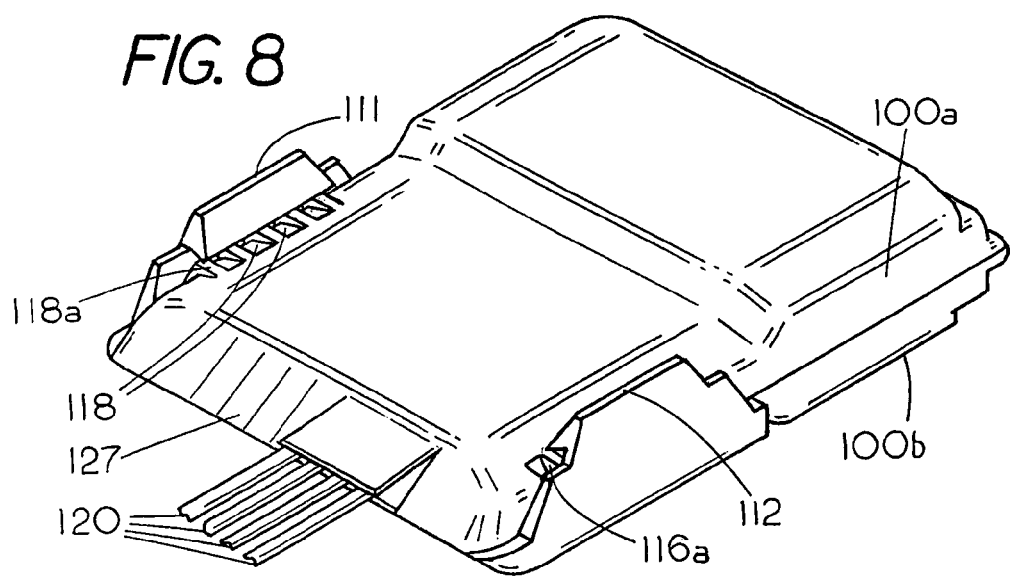
FIG. 8 shows direct bury splice kit of FIG. 6 in a closed condition with a push-in wire connector.

FIG. 8 shows the first set of ribs 116 having an inwardly angled top 116a for engaging lip 112a of extension 112. Similarly, lip 111a can engage an inwardly angled top 118a on a set of ribs 118. In this embodiment the closing of the pods 100a and 100b causes the resiliency of the extensions to slide over and automatically latch by engaging ribs 116 and 118 to hold the pods 100a and 100b in a closed condition. While the resilient extensions provide a self-latching feature, if desired the extensions could be engaged by finger pressure on the extensions when the pod 100a and 100b have been brought to a closed condition.

FIG. 6 shows jaw face 106 terminates without an end wall and jaw face 105 terminates in a breakable end wall 127 that can be selectively broken in sections to create paths for wires 120 to extend between the jaw face 105 and jaw face 106 and through the end wall 127 as shown in FIG. 8. Located at an internal end of jaw 105 is a shoulder or stop 122 to assist in axially restraining a wire connector in connector housing or closed pod 100. Similarly located at an internal end of jaw 106 is a shoulder or stop 121 to assist in axially restraining a wire connector in pod 100.

In operation of connector housing 100 a wire connector with wire leads extending therefrom is placed in the sealant 125 in pod 100b or in the sealant 126 in pod 100a. The sealant is preferably a gel type sealant that is characterized by being sufficiently viscous so as to remain in the pod as the housing is moved about. The connector is preferably a push-in connector.

When the pods 100a and 100b are brought into a closed condition as shown in FIG. 8 the sealant 125 in pod 100b and the sealant 126 in the pod 100a is forced around a wire connector located therein to form a waterproof encapsulation of the wire connector within the confines of the closed housing. In order to ensure the wire connector is encapsulated sufficient sealant is placed in each of the pods so that sealant is forced to flow around the wire connector in pockets 108 and 109. The three sided cooperating between U-shaped channel 103 and U-shaped wall 104 ensures that the excess sealant is directed toward the end of the housing proximate the jaws. As a consequence any excess sealant is forced along the wires 120 to provide a waterproof seal there around.

Thus, in operation of the direct bury splice kit 100 a wire connector with leads extending therefrom can be automatically waterproofed by merely closing connector housing 100. That is pivoting pod 100b and pod 100a about hinge 102 bring the pods into engagement with each other, which forces the sealant in pockets 125 and 126 to encapsulate the wire connector with excess sealant directed along jaw face 106 and 105. Continuing the closing of the pods brings the jaws into clamping engagement and allows the resilient extensions 111 and 112 to engage the ribs 116 and 118 to hold the connector housing 100 in a closed condition with the wire connector therein in an encapsulated condition.

FIG. 7 shows the direct bury splice kit 100 with pod 100*b* and 100*a* in the open condition and a push-in connector 130 located therein. As can be seen the push-in wire connector is located in a wire connector cavity that is formed partially in pod 100*b* and partially in pod 100*a*. Direct bury splice kit 100 is similar to direct bury splice kits 60, 50, 51, 10 and 40 in that each contains a wire connector cavity for encapsulating and holding a wire connector as well as a channel for encapsulating and covering a portion of the wires therein.

In each of the embodiments of the partial pod connectors a latch is included for holding the partial pods together when the two partial pods are brought into face-to-face engagement with each other. While latches are preferred an alternate embodiment and method the partial pods could be held in the closed condition by a clip or the like or conventional electrical tape or the like can be wrapped around the pods to hold the partial pods in the encapsulated condition around the wire connectors.

Thus the invention includes a direct bury splice kit for an underground electrical connection comprising a partial pod having no wing or an interrupted peripheral wing with a mateable face with the partial pod having a wire channel located therein with the wire channel extending inward from an end of the partial pod and terminating in a partial wire connector cavity. A second pod, which can be a plane member or a domed member identical to the partial pod, can be used for forming an enclosure with the partial pod. When the partial pod and the second pod are brought into engagement in the presence of a sealant the partial pod and the second pod form an enclosure around a wire connector and the sealant forms an in situ sealant encapsulation of a wire connector and an electrical lead extending therefrom. A closure member can be used to hold the two pods in mating engagement.

If the second pod comprises a flat surface and the wire channel in the partial pod is formed sufficiently large to encapsulate the wire connector and the sealant therein when the second pod is joined to the first pod. Also the partial pod and the second pod need not be hinged to each other but preferably are hinged to each other to permit quick folding and aligning the pods into an encapsulating condition around a wire connector.

Thus the invention includes a housing for an electrical connector having an electrical connector thereon comprising: a pod having a wire channel located therein with a channel extending inward from an end of the pod; a cover for forming an enclosure with the pod; and a sealant located in the channel so that when the pod and the cover are brought into engagement the pod and the cover form an enclosure around a wire connector and the sealant forms an in situ sealant encapsulation of a wire connector and an electrical lead extending therefrom. If the cover and the pod are hinged together the closing of the cover on the pod simultaneously forms the in situ encapsulation.

A further feature of the examples of FIGS. 1-6 is that chamber formed by the pods can accommodate a wide range of wire connectors.

Figure 9:
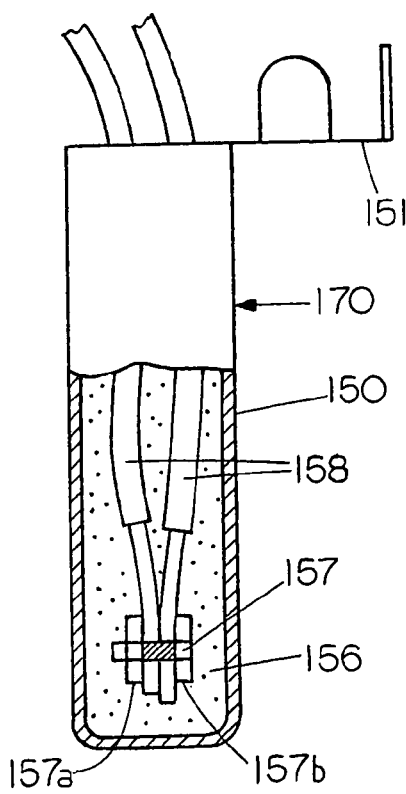
FIG. 9 shows direct bury splice kit in an open condition with a split bolt wire connector immersed in an elongated sealant carrying tube.
Figure 10:
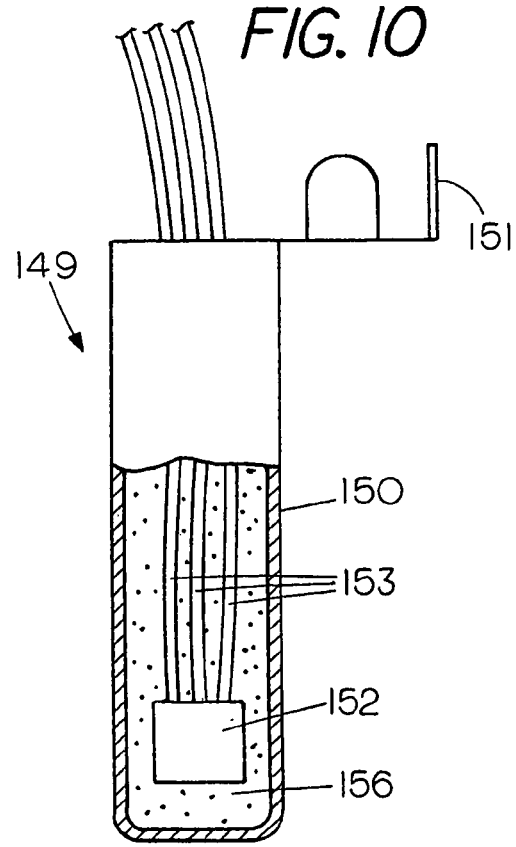
FIG. 10 shows direct bury splice kit in an open condition with a push-in wire connector immersed in an elongated sealant carrying tube.

While the embodiments of FIGS. 1-8 provide for a direct bury splice kit that reduces the potential for defective splices the embodiment of FIGS. 9 and 10 similarly provide a direct bury splice kit for reducing the potential for defective splices. FIG. 10 shows a conventional grease tube 150 having a cap 151. Direct bury splice kit 149 includes a push-in wire connector 152 and a set of three wires 153 extending from the backside of wire connector 152. In the embodiment of FIG. 10 the wires in the push-in wire connector 152 are pushed into the sealant 156 in the identical manner that the twist-on wire connector is pushed into the sealant of the conventional grease tubes. However, the use of a push-in connector as opposed to a twist-on wire connector enhances the ability to form an electrical connection with minimal chances for field failure. That is, in a twist-on wire connector the wires are held proximate each other by the spiral threads in the wire connector. By pushing on the wires in a twist-on wire connector one may cause the wire junction to be loosened since the wires are only held in contact by the lateral pressure on the wires by the sidewall of the spiral thread. For example, too much force on one of the wires may cause failure of the wire connection since one or more of the wires might become dislodged from their common junction. On the other hand since the push-in wire connector 152 uses separate compartments for wires 153 with the connection being formed by the act of pushing the wire into the push-in wire connector, hence the act of pushing on each or all of the wires to insert the push-in wire connector into the grease is a natural connection forming member which avoids the potential adverse effect that can occur with pushing on the leads of twist-on wire connectors.

FIG. 9 shows a further direct bury splice kit 170 that also provides a direct bury splice kit for reducing the potential for defective splices. In the embodiment of FIG. 9 the direct bury splice kit 170 includes the grease tube 150, a cover 151 and a sealant 156 located in the closed end of the grease tube 150. The wires 158 are secured to each other through a split bolt connector 157. Split bolt connectors are known in the art and comprise a bolt with a slot for insertion of wires therein. Tightening nut 157*a* against 157*b* clamps the wire ends of wire 158 into electrical engagement with each other. An advantage of the split bolt connector 157 is that the wires can be securely fastened and held in electrical contact with respect to each other by a mechanical connection. Consequently, since the wires are mechanically linked to each other through a split bolt connector uneven force on wires during the insertion of the split bolt connector 157 into the sealant minimizes chances for disrupting the electrical connection between the wires which has the potential for field failure.

Thus with each of the afore described examples of direct bury splice kits the potential for field failure of the electrical connection is avoided or minimized with the embodiments of FIGS. 1-8 minimizing the opportunity for failure by eliminating push-in stresses on the wires in the wire connectors through use of folding pods and the embodiment. FIG. 10 minimizes the opportunity for failure of an electrical connection by employing the assembly technique of the connector, namely, push on the wire and FIG. 9 minimizes the opportunity for failure of an electrical connection through a mechanical clamping of the electrical wires ends with a split bolt connector to form an electrical connection that can withstand unequal pushing forces on the wire leads without disrupting the electrical connection.

In contrast to the prior art direct bury kits that require one to push the end of a twist-on wire connector into an electrical insulating sealant in a grease tube by pushing on the wire leads extending from the twist-on wire connector the present invention provides a system, apparatus and method of splicing electrical wires that minimizes the potential for disrupting the spliced wire junction in a twist-on wire connector.

We claim:

1. A decoder system wherein a control signal and an electrical power signal are sent over the same underground electrical path comprising:
   a controller;

an electrical wire extending from said controller;
an electrical controllable irrigation valve having an electrical wire extending therefrom;
at least one electrical splice formed by joining the electrical wire from said controller to said electrical wire from said electrical controllable irrigation valve;
a wire connector for maintaining the electrical wire from the controller and the electrical wire from the electrical controllable irrigation valve in said electrical splice in an electrical connection; and
an encapsulating pod comprising mateable pod parts with at least one of the mateable pod parts having a sealant therein with the mateable pod parts mateable around the wire connector containing the electrical splice to encapsulate the electrical splice therein in a waterproof condition.

2. The decoder system of claim 1 wherein the mateable pod parts include a first partial pod having an interrupted peripheral wing with a mateable face, said first partial pod having a wire channel located therein with the wire channel extending inward from an end of the first partial pod and terminating in a wire connector cavity; and
a second partial pod having an interrupted peripheral wing with a mateable face and a partial wire channel located therein with the partial wire channel of the second partial pod extending inward from an end of the second partial pod and terminating in a partial wire connector cavity in the second partial pod so that when the first partial pod and the second partial pod are brought into face to face engagement the first partial pod and the second partial pod form an enclosure around a wire connector and the sealant forms an in situ sealant encapsulation of a wire connector and an electrical lead extending therefrom.

3. The decoder system of claim 2 wherein each of the first partial pod and the second partial pod include a second partial wire connector channel and a second partial wire connector cavity and the sealant comprises a gel.

4. The decoder system of claim 1 wherein the encapsulating pod comprises a first rigid partial pod and the second rigid partial pod.

5. The decoder system of claim 1 wherein the wire connector comprises a twist-on wire connector and the encapsulating pod includes a latch for securing the mateable pod parts to each other.

6. The decoder system of claim 5 wherein the mateable pod parts are held in a face-to-face condition to retain the sealant therein.

7. The decoder system of claim 1 wherein the encapsulating pod includes a shoulder located at an internal end of a partial wire channel and proximate a partial wire connector cavity to assist in retaining the wire connector therein.

8. The decoder system of claim 1 with a one of the mateable pods includes a partial wire connector cavity having a larger cross sectional dimension than a cross sectional dimension of the partial wire channel of the first partial pod.

9. A method of direct bury of an electrical splice in a an underground decoder system comprising the steps of:
using a wire connector to electrically connect an end of an electrical wire from an irrigation valve to the underground decoder system into an electrical connection with a further electrical wire by bringing the electrical wire and the further electrical wire into electrical contact to form an electrical junction in the wire connector;
placing the electrical wire and the further electrical wire with the electrical junction into a wire channel in a first partial pod or a second partial pod with at least one of the partial pods carrying a flowable sealant therein;
closing the first partial pod and the second partial pod about the wire connector and the end of the electrical wire and the further electrical wire to provide in situ encapsulation of the wire connector and the end of the electrical wires;
connecting the underground decoder system to an irrigation controller.

10. The method of claim 9 wherein the step of closing includes folding the first partial pod and the second partial pod about the wire connector.

11. The method of claim 9 including the step of latching the first partial pod and the second partial pod to each other to maintain the partial pods in an encapsulating condition.

12. The method of claim 9 wherein the step of using a wire connector comprises using either a twist-on wire connector, a push in wire connector or a split bolt connector.

13. A direct bury decoder splice kit for forming a waterproof underground electrical connection in a decoder system comprising:
a wire connector;
a first partial pod, said first partial pod having a wire channel located therein with the wire channel extending inward from an end of the first partial pod and terminating in a partial wire connector cavity;
a second partial pod for forming an enclosure with the first partial pod when said second partial pod and the first partial pod are mated to each other wherein said first partial pod comprises a domed member and at least one of said first partial pod and said second partial pod include a shoulder for retaining a wire connector therein; and
a sealant located in either or both of said first partial pod and said second partial pod so that when the first partial pod and the second partial pod are brought into mating engagement the first partial pod and the second partial pod form an enclosure around the wire connector while the sealant forms an in situ waterproof sealant encapsulation of a wire connector and an electrical lead extending therefrom.

14. The direct bury decoder splice kit of claim 13 wherein the second pod and the partial pod are identical.

15. The direct bury decoder splice kit of claim 13 wherein the second pod includes a closure member and the sealant comprises a peelable gel.

16. The direct bury decoder splice kit of claim 13 wherein the second partial pod and the first partial pod each include a flange and the wire channel in the first partial pod is sufficiently large to encapsulate the wire connector and the sealant therein when the second partial pod is joined to the first partial pod.

17. The direct bury decoder splice kit of claim 13 wherein the first partial pod and the second partial pod are hinged to each other to permit folding the second partial pod and the first partial pod into an encapsulating condition around a wire connector.

18. A direct bury kit for splicing two or more wires comprising:
an electrical connector, said electrical connector maintaining each of a pair of electrical wires in electrical contact with each other to form an electrical splice;
a split pod container having a first partial pod and a second partial pod each partial pod having a chamber and a shoulder therein for retaining the electrical connector thereon when the first partial pod and the second partial pod are in a closed condition; and
a sufficient amount of sealant located in said chamber so that when said electrical connector is inserted into the sealant the electrical contact between the electrical wires is maintained as the sealant encapsulates and waterproofs the electrical splice, the first partial pod having a U-shaped channel for mating with a U-shaped wall of the second partial pod so that when the first partial pod and the second partial pod are in the closed condition the U-shaped channel and the U-shaped wall retain the sealant located in the chamber from being forced therepast.

19. The direct bury kit of claim 18 wherein the electrical contact is maintained by folding said split pod container about the electrical contact.

20. The direct bury kit of claim 18 wherein the electrical contact is maintained by clamping each of the pair of electrical wires to each other so that pushing said electrical connector into the sealant in said chamber does not disrupt the electrical contact.

21. The direct bury kit of claim 18 wherein the electrical connector comprising a push in wire connector that can be pushed into the sealant by pushing on the pair of electrical wires.

22. The direct bury kit of claim 18 wherein the electrical connector is selected from the group of electrical connectors comprising a split bolt connector wire connector, a push in wire connector and a twist-on wire connector.

* * * * *